United States Patent [19]

Joy

[11] Patent Number: 4,682,550
[45] Date of Patent: Jul. 28, 1987

[54] HAND-HELD APPARATUS AND METHOD FOR LOOSENING, AERATING AND FERTILIZING SOIL PLANT ROOTS

[76] Inventor: Stanley E. Joy, 6611 W. 69th Way, Arvada, Colo. 80003

[21] Appl. No.: 780,973

[22] Filed: Sep. 27, 1985

[51] Int. Cl.$^4$ .............................................. A01C 15/02
[52] U.S. Cl. ..................................................... 111/7.1
[58] Field of Search ........................... 111/7.1, 7.2, 7.4

[56] References Cited

U.S. PATENT DOCUMENTS

| | | | |
|---|---|---|---|
| 1,422,831 | 7/1922 | Camp | 111/7.1 |
| 1,755,445 | 4/1930 | Irish | 111/7.1 |
| 1,814,445 | 7/1931 | Irish | 111/7.1 |
| 2,083,153 | 6/1937 | Irish | 111/7.1 |
| 2,323,773 | 7/1943 | Irish | 111/7.1 |
| 2,857,864 | 10/1958 | Cromer | 111/95 |
| 3,026,827 | 3/1962 | Cunningham | 111/7.1 |
| 3,040,680 | 6/1962 | McCluskey | 111/7.4 |
| 3,142,273 | 7/1964 | Dilts | 111/7.1 |
| 3,900,962 | 8/1975 | Chan | 47/48.5 |
| 3,916,564 | 11/1975 | Crowell, Sr. | 47/48.5 |
| 4,156,396 | 5/1979 | Konucki | 111/7.1 |
| 4,429,647 | 2/1984 | Zinck | 111/6 |
| 4,432,291 | 2/1984 | Shirley | 111/7.1 |

FOREIGN PATENT DOCUMENTS 798638 11/1968 Canada .................................. 111/7.1

Primary Examiner—Richard J. Johnson
Attorney, Agent, or Firm—Cahill, Sutton & Thomas

[57] ABSTRACT

A hand-held apparatus is connected by means of an air hose to a high pressure compressor and air tank unit, and is connected by means of a hose to a conventional water faucet. The device includes a bin for storing granular fertilizer and an air valve connecting the high pressure air supply into a rigid outer tube that is inserted into a pre-drilled hole in the ground. An operator stands on a horizontal ground plate attached to the outer tube to seal the hole, and opens that air valve to force high pressure air into the predrilled hole, creating many small crevices in the soil around the roots of a plant. The fertilizer in the bin then is released into the outer tube. The high pressure air valve is reopened. The high pressure air forces the granular fertilizer out of the bottom of the outer tube and into the previously created crevices. Pressurized water then is conducted through a water valve to an inner tube concentric with the outer tube, forcing the water into the crevices, dissolving the fertilizer, moisturizing the soil and roots, and sealing the crevices by causing the moistened soil to collapse.

11 Claims, 8 Drawing Figures

U.S. Patent  Jul. 28, 1987  4,682,550
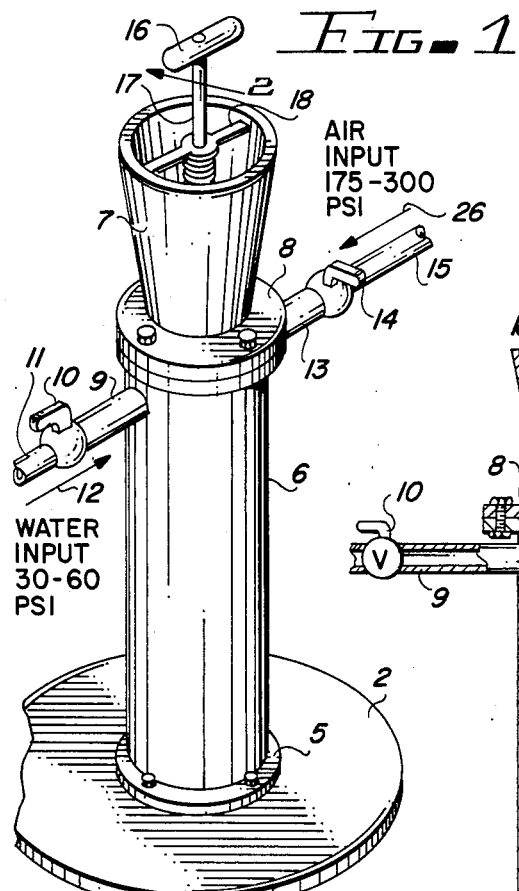
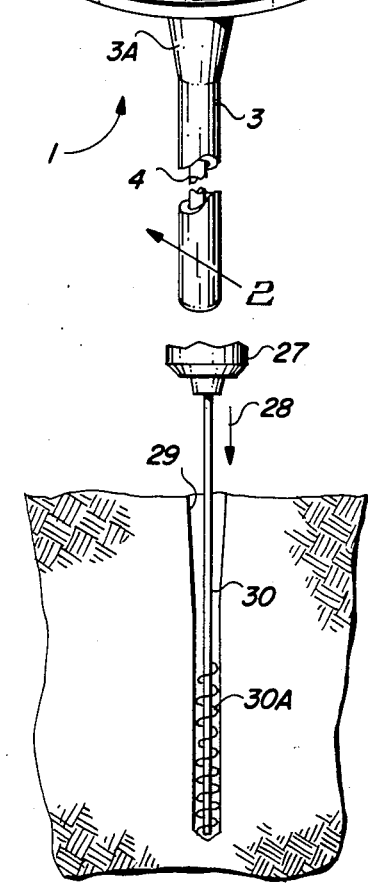
FIG. 4A
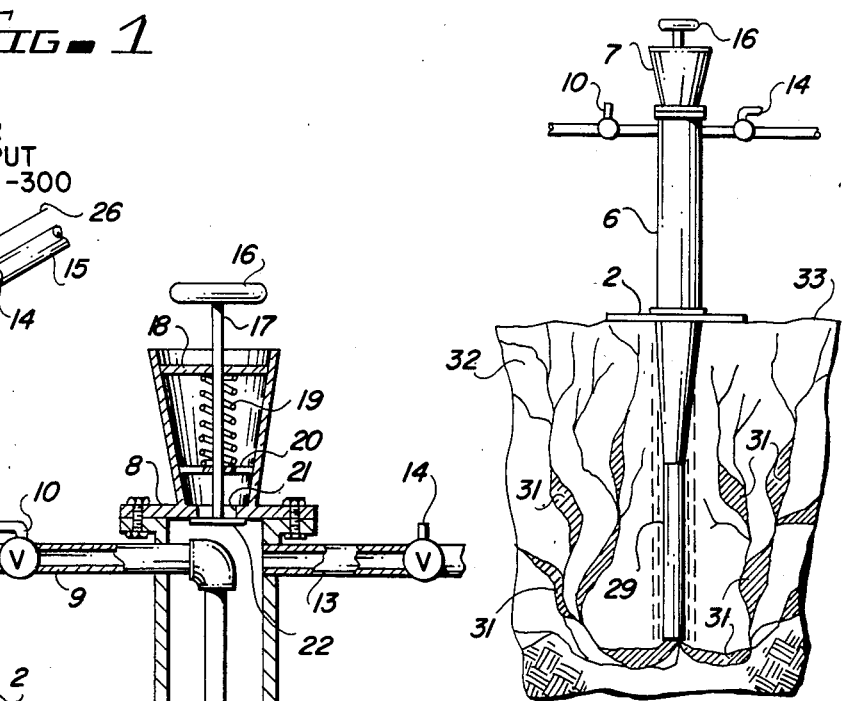
FIG. 2
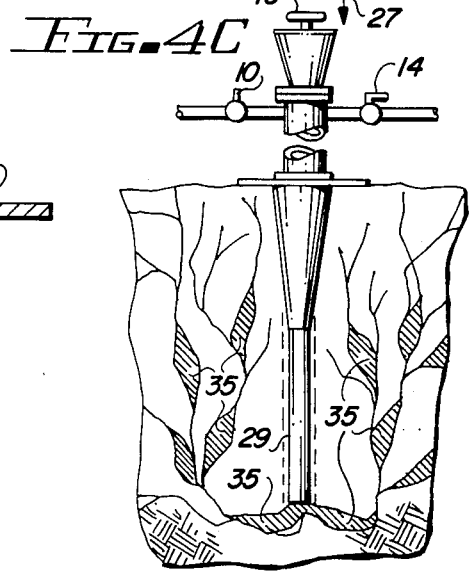
FIG. 4B
FIG. 4C
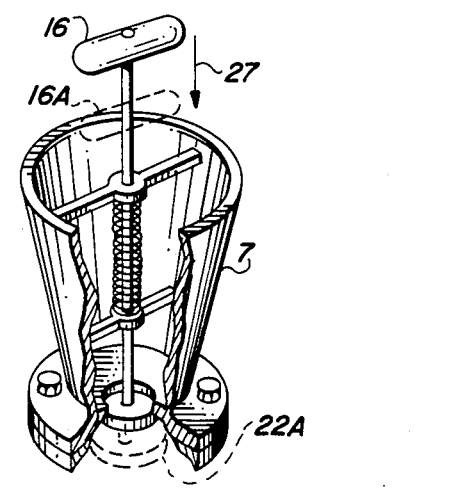
FIG. 3

HAND-HELD APPARATUS AND METHOD FOR LOOSENING, AERATING AND FERTILIZING SOIL PLANT ROOTS

BACKGROUND OF THE INVENTION

The invention relates to a hand-held device for forcing high pressure air into the ground around plant roots, loosening the soil and producing crevices therein, forcing granular fertilizer, pesticides, chemicals or the like into the crevices, and using the same device to force water into the crevices to dissolve the fertilizer or chemicals.

It is known that forcing substantial quantities of compressed air into the ground around the roots of trees and large shrubs can be beneficial, by loosening the soil, allowing escape of toxic materials that may be in the soil, and especially by facilitating injection of beneficial materials such as fertilizers and chemicals close to the plant roots. The same benefits have been recognized for broad scale application in commercial agricultural applications. U.S. Pat. No. 4,429,647 discloses an apparatus connected to a high pressure air source and to a liquid fertilizer tank, for use in commercial agriculture. A system is described wherein a number of probes mounted on a tractor are forced by hydraulic means to a certain depth in the ground, wherein high pressure air then is forced through the probe in the soil, causing breaking up of the soil. Liquid fertilizer then is forced into the voids and cracks produced in the soil by the compressed air. The device described in U.S. Pat. No. 4,429,647 is not practical for use in private and commercial horticultural applications, as substantial force must be applied by a large machine to force the probes into the ground and to hold the probes in the ground when the high pressure air is applied. Small, hand-held devices that can be fit into small spaces and rapidly and easily deployed would be required for such private and commercial horticultural applications. Several hand-held devices for aerating soil around the roots of trees and shrubs are disclosed in U.S. Pat. Nos. 1,814,445 and 1,755,445. The latter patent discloses use of compressed air forced through a tube into the ground to first open up crevices around the roots by means of compressed air, and then diverts the compressed air into a fertilizer tank, forcing the fertilizer through the same tube into the round to fill up the crevices. No such device has been widely used, however, probably because of the difficulty that an ordinary worker would experience in using it. If enough air pressure is applied to be effective in breaking up tightly packed, hardened soil around the roots of trees and shrubs, it would be difficult for most workers to keep the device in the ground and prevent most of the compressed air from flowing out into the atmosphere through the top of the hole into which the device is inserted, rather than being forced into the ground at the bottom of the hole and thereby loosening the soil.

A variety of devices that are insertable into the ground for providing controlled irrigation of plant roots and injection of chemicals and fertilizer also are known, as indicated in U.S. Pat. Nos. 4,432,291; 3,916,564; and 3,900,962.

Despite the fairly widespread recognition that there can be advantages to using compressed air to loosen dirt around the roots of trees and shrubs, and that there can be advantages of conducting fertilizer and water through inserted tubes to locations fairly deep in the ground near the roots of plants, no one has yet provided an inexpensive, effective, hand-held device that can easily economically and rapidly improve the growth and appearance of trees and shrubs. There remains an unmet need for such a device.

SUMMARY OF THE INVENTION

Accordingly, it is object of the invention to provide an economical, hand-held device that can be operated easily by one person, and is capable of effectively breaking up soil around the roots of trees and plants with compressed air, injecting fertilizer into the loosened soil, and injecting water therein to rapidly dissolve the fertilizer and seal the crevices, all in a single operation.

Briefly described, and in accordance with one embodiment thereof, the invention provides a hand-held apparatus including an air hose for connection to a portable high pressure air source, a water hose for connection to an ordinary water supply, air and water valves for selectively connecting an outer tube of the apparatus inserted into a pre-drilled hole in the ground in the vicinity of plant roots and an inner concentric tube, respectively, a flat ground plate on which an operator stands to seal the mouth of the pre-drilled hole and prevent the high pressure air from effectively forcing the device out of the pre-drilled hole, the apparatus including a fertilizer bin and valve by means of which the high pressure air forces granular fertilizer into the crevices created by loosening of the soil, wherein the water valve is actuated to inject water into the crevices, dissolving the fertilizer therein, moistening the soil, and causing collapse and sealing of the crevices. In the described method of using the operation, the compressed air rapidly lifts up the device and the person standing on the ground plate thereof; it repetitively "overshoots" upward and falls back into the hole. The result is an effective "hammering" action that causes the compressed air to effectively loosen the soil, and subsequently inject fertilizer into the loosened soil.

BRIEF DESCRIPTION OF THE DRAWINGS

FIG. 1 is a partial perspective illustrating the device of the present invention.

FIG. 2 is a section view along section line 2—2 of FIG. 1.

FIG. 3 is a partial cutaway perspective view useful in illustrating certain features of the fertilizer bin of the device of FIG. 1.

FIGS. 4A–4E are section views that are useful in explaining the operation of the device of FIG. 1.

DESCRIPTION OF THE INVENTION

Figure 4D:
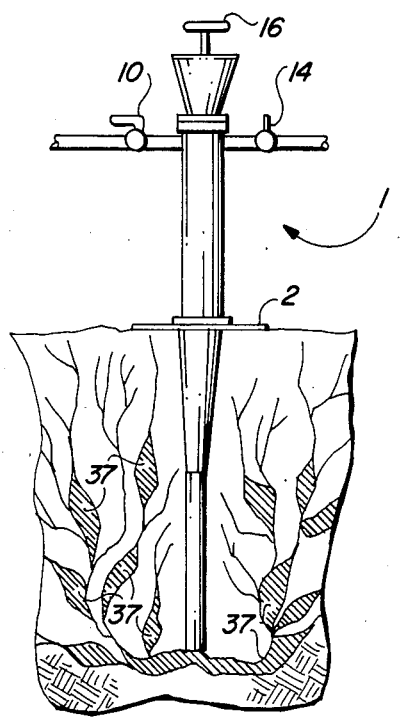
Figure 4E:
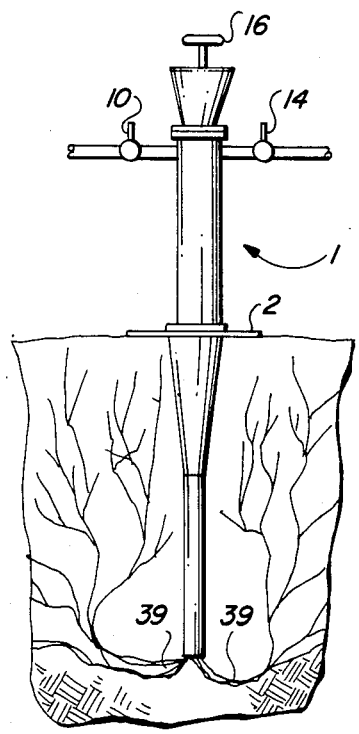

Referring now to the drawings, especially FIG. 1, hand-held root treatment apparatus 1 includes a round, annular ground plate or collar that is approximately 15 inches in diameter and one-eighth of an inch thick. An outer tube 3 extends downward from (and can be integral with) ground plate 2. The upper portion of outer tube 3 tapers outwardly from an outside diameter of about two inches to about three inches. The length of tube 3, measured from the bottom of ground plate 2 to the bottom end 25 is approximately 20 inches in the described embodiment of the invention.

An inner tube 4 extends concentrically through outer tube 3. The outside diameter of inner tube 4 is about five-eighths of an inch. The inside diameter of outer tube 3 is about one and three-quarters inches. The bore through inner tube 4 is approximately one-half of an inch in diameter.

An upper chamber 24 is bounded by a cylindrical housing 6, the bottom of which is clamped in a sealed manner by means of a flange 5 and suitable bolts to the upper surface of ground plate 2. Chamber 24 has a diameter of about six inches. The thickness of the wall of cylindrical housing 6 is about one-fourth of an inch. The height of cylindrical chamber 6 is about 20 inches. Chamber 24 is in open communication with the space between outer tube 3 and inner tube 4.

At the top of cylindrical chamber 6, a reservoir 7 is attached by a flange 8 in sealed relationship with a flange that is integral with the top of cylindrical cylinder 6. Chamber 7 has an open top, into which granular fertilizer, pesticide or other appropriate chemicals are poured. An opening 21 in the bottom of reservoir 7 is normally closed by means of a valve plate or trap door 22 that is attached to the lower end of a vertical plunger or rod 17. Rod 17 is supported in and extends through two bushings in support arms 18 and 20 that are rigidly attached to the inside wall of reservoir 7. The walls of reservoir 7 are sloped outward to ensure that when trap door 22 is opened by depressing handle 16, all of the granular contents in reservoir 7 will easily fall downward through opening 20 into chamber 24.

A compression spring 19 is disposed between bushing support arms 18 and 20, and is attached to rod 17 to urge rod 17 to its uppermost position, thereby urging valve plate 22 upward against the bottom of reservoir 17 around the mouth of hole 21. A suitable resilient washer can be provided around the periphery of plate 22 and/or the material surrounding the bottom of opening 21 to produce a high pressure seal that prevents air from escaping upward through hole 21 into reservoir 17 when high pressure air is forced into chamber 24, as next described. When high pressure air is forced into chamber 24, the upward pressure on the bottom of trap door 22 aids spring 19, improving the sealing of trap door 22 to the bottom of reservoir 7.

A horizontal air inlet pipe 13 is rigidly attached, to the upper end of cylindrical housing 6, and opens into chamber 24. An air valve 14 is attached in open communication with air inlet pipe 13 and a flexible high pressure air hose 15. Air hose 15 is connected to a portable air compressor/pressure tank unit that stores a suitable supply of air at a pressure of about 170 to 300 pounds per square inch, although even higher air pressure, such as 400 pounds per square inch or more could be used. Thus, when air valve 14 is opened, high pressure air in the storage tank is forced into chamber 24, through the space between outer tube 3 and inner tube 4 and out of the open bottom end 25 of the root treatment device 1.

A water tube 9 is rigidly attached to the exterior of cylindrical housing 6, in diametrically opposed relationship to air inlet tube 13. Water inlet tube 9 passes through the wall of housing 6 and is connected by means of an elbow to the upper end of inner tube 4. A water valve 10 is connected in open communication with the outer end of water inlet tube 9 and a hose, the other end of which is connected to an ordinary water faucet from which water having a pressure of 30 to 60 pounds per square inch is supplied.

Water inlet pipe 9 and air inlet pipe 13 are sufficiently rigidly attached to the upper end of cylindrical housing 6 that they effectively serve as handles by means of which an operator can control the root treatment apparatus 1.

FIG. 3 illustrates the use of reservoir or hopper 7 in more detail. When reservoir 7 is filled with granular fertilizer or other treatment chemicals, and the operator desires to dump the fertilizer or chemicals in reservoir 7 into chamber 24, the operator simply pushes handle 16 downward in the direction of arrow 27 in FIG. 3 to the position indicated by dotted lines 16A. This causes valve plate 22 to be lowered to the position indicated by dotted line 22A, thereby opening passage 21, so that the fertilizer or chemicals can be forced by high pressure air out of the lower end of root treatment apparatus 1.

The method of using and operating the root treatment apparatus 1 in accordance with the present invention is described with reference to FIGS. 4A–4E.

Referring first to FIG. 4A, a pneumatic drill 27 is used to pre-drill a number of holes such as 29 in the soil around the roots of a tree or shrub. The holes are preferably about 2 inches in diameter and 26 inches deep. As indicated in FIG. 4A, the diameter of the predrilled hole at the top thereof is somewhat greater than at the bottom due to the looseness of soil near the surface and tilting of the pneumatic drilling device as the hole is drilled, further loosening soil near the mouth of the hole. It is for this reason that the outwardly tapered upward portion 3A of outer tube 3 is provided, as best seen in FIG. 2. Thus, when the tube 3 is inserted into the predrilled hole 29, it fits fairly tightly, even at the enlarged mouth of the hole. The pneumatic drill 27 is forced into the ground as indicated by arrow 28, so that its drilling edges 30A, supported by shank 30, produce the desired hole. Pneumatic drill 27 then is removed.

Next, the root treatment apparatus 1 is lowered into the predrilled hole 29. Since the outer tube is 20 inches long, the bottom 25 of tube 3 will be positioned about six inches from the bottom of the 26 inch pre-drilled hole 29, when ground plate 2 rests on the surface 33 of the ground 32.

The operator then stands on the top of ground plate 2, one foot on either side of cylindrical housing 6. The operator grasps the "handles" consisting of water inlet pipe 9 and air inlet pipe 13, and opens the air valve 14, so that pressurized air is forced out of the bottom 25 of tube 3 into the bottom of pre-drilled hole 29. Water valve 10 is turned off. The air pressure is sufficiently high that a large number of small cracks and crevices such as 31 surrounding pre-drilled hole 29 will be formed, loosening and aerating the soil. The weight of the operator standing on ground plate 2 tends to seal the periphery of the upper portion of the pre-drilled hole, preventing dirt from being blown upward at the operator.

As a practical matter, the air pressure is sufficiently great that if the deep soil 32 is tightly packed, the air pressure will tend to lift both the operator and the root treatment apparatus 1 upward a few inches to allow compressed air to escape. The upward momentum or "overshooting" of the root treatment device 1 and the operator thereon will be reversed due to the force of gravity, causing the root treatment apparatus 1 and operator standing thereon to "fall" back into the pre-drilled hole 29. This occurs in a repetitive manner, producing a "hammering" or surging effect that substantially aids the breaking up and loosening of the soil 32 and the formation of crevices 31 therein.

Next, referring to FIG. 4C, and assuming that the operator has previously poured fertilizer into reservoir 7, the operator turns off air valve 14, and presses handle 16 downward as indicated by arrow 27, causing the fertilizer to fall into the chamber 24. The operator then re-opens air valve 14. The re-opening of air valve 14 causes the 175 to 300 psi air to be forced into chamber 24, thereby forcing the fertilizer downward through tube 3 and into the crevices or voids 31 previously produced in the loosened soil, as indicated in FIG. 4B.

The next step in the procedure is described with reference to FIG. 4D. The operator, still standing on ground plate 2, turns off air valve 14 and opens water valve 10. This causes 30 to 60 psi (pounds per square inch) water to flow in the direction of arrow 12 (FIG. 1) through inner tube 4, out of the bottom 25 of the root treatment device 1, and into the previously created voids and crevices that are now filled with fertilizer, as indicated by 35 in FIG. 4C. The water forced into the crevices is indicated by reference numerals 37 in FIG. 4D, and rapidly soaks the fertilizer and the loosened soil, thereby moisturing the soil around the roots of the tree or shrub and almost immediately bringing high nutrient solution in contact with the roots so it may benefit the tree or shrub.

It should be noted that the initial loosening of the soil by the injected high pressure air, as previously described, usually results in breaking a large number of tiny roots of the plant where the various voids and crevices are formed. At such locations, the plant almost immediately begins growing tiny new rootlets in the vicinity of the voids into which fertilizer and moisture has been injected. This results in the above-mentioned immediate supplying of high nutrient material to the plant and resulting in the major improvement of the growth and health of the plant.

The last step in the operation is to turn water valve 10 off, relieving all pressure in the previously created voids. Ordinarily, by this time enough soaking will have occurred that the crevices and voids become sealed, or the soil around them collapses, as indicated by reference numerals 39 in FIG. 4E.

The amount of time required for each of the above steps may vary. Initially, the high pressure air may be applied to intially create the crevices 29 of FIG. 4B for about 15 seconds to 30 seconds. Once this step is complete and the fertilizer has been dumped from reservoir 7 into chamber 24, the high pressure air needs to be applied for approximately 20 seconds to adequately force the granular fertilizer into the previously created crevices to produce the condition indicated by reference numerals 35 in FIG. 4C. It may be necessary to repeat the 15 to 30 second applications of the compressed air five ten times at 15 to 30 second intervals to achieve the desired loosening of the soil in some cases. Finally, the high pressure water is applied to insert typically 15 to 20 gallons into the loosened soil and fertilizer therein. Then compressed air can be applied again to force water further into the crevices, to produce the condition illustrated in FIG. 4D. Finally, the condition shown in FIG. 4E can be expected about 15 seconds to 20 seconds after the water has been forced into the crevices by the air.

I have found that use of the root treatment apparatus 1 in the above-described manner results in more effective, rapid treatment of trees and large shrubs with more notable and rapid results than any other fertilizing and- /or chemical treatment technique of which I am aware.

The described device thus provides a hand-held root treatment device that can be operated by one operator. In a single operation, soil around the roots of a plant can be loosened, treated with fertilizer or other beneficial chemical substance, and moistened in such a manner as to have the most benefit to the plants in the shortest amount of time, without the use of bulky, expensive, or complex equipment as required by some prior art devices and without the requirement of using separate tools and performing separate operations with the separate tools are required by other prior art devices.

The described device has the advantages that it is light in weight, as it weighs only about 45 pounds, and could be made even lighter by use of lighter materials and by use of a more optimized design. The device can be used easily by one operator, can be easily fit into tight spaces, and does not require any expensive auxiliary equipment either for supporting it or for supplying it with pressurized water and air as air compressors that will work very satisfactorily are readily available at low cost.

While the invention has been described with reference to a particular embodiment thereof, those skilled in the art will be able to make various modifications to the described embodiment of the invention without departing from the true spirit and scope thereof. It is intended that all devices and methods that are equivalent to those described herein in that they produce substantially the same function in substantially the same way to produce substantially the same result are within the scope of the invention. For example, the apparatus could be modified to place liquid fertilizer or other chemical treatment substance in the path of the high pressure air so that the liquid fertilizer or chemical treatment material is injected in the cracks and crevices in the loosened soil when the air valve is reopened. The subsequently injected pressurized water could then dilute and disperse the injected liquid fertilizer or chemical treatment material. The water injected into the crevices might be mixed with suitable chemical substances before being ejected from the bottom of the conduit into the ground.

I claim:

1. An apparatus for treating the roots of plants, the apparatus comprising in combination:
   (a) an upper generally cylindrical housing including a radial flange at the lower end thereof;
   (b) first tubular means for insertion into a predrilled hole in soil near the roots of the plant for controllably conducting highly pressurized air into the predrilled hole to loosen the soil and produce voids and cracks therein said first tubular means including a downwardly tapered portion and an annular flange portion at the upper end thereof;
   (c) means supported by said housing for controllably placing fertilizer or other chemical treatment material in the path of the highly pressurized air to allow the highly pressurized air to force the fertilizer or chemical treatment material through the first tubular means and into the voids and cracks;
   (d) second tubular means for insertion into the predrilled hole simultaneously with the first tubular means for controllably conducting pressurized water or treatment liquid into the voids and cracks to dissolve the fertilizer or chemical treatment material in the voids and cracks, moisten the soil around the voids and cracks and carry dissolved nutrient or treatment chemicals to the roots before the apparatus is removed from the predrilled hole;
   (e) means rigidly connecting the annular flange means on the upper end of the first tubular means to said housing radial flange, an annular plate means associated with said connecting means for supporting the entire weight of an operator in order to hold the first tubular means in the predrilled hole when the highly pressurized air is being conducted through the first tubular means into the bottom of the predrilled hole, said annular plate means also limiting the depth of insertion of the first tubular means into the predrilled hole and providing a sealing of the tapered portion on the first tubular means to the mouth of the predrilled hole; and (f) means for supplying the highly pressurized air with sufficient pressure that and if the soil is sufficiently tightly packed and the operator stands on the operator weight supporting means, the highly pressurized air lifts the apparatus and the operator standing thereon slightly above the ground, releasing some of the air pressure, whereby the apparatus and operator thereon then fall downward until the annular plate means rests on the ground, re-sealing the mouth of the predrilled hole, thereby causing repetitive surging in the pressure of the highly pressurized air being forced into the soil, thereby effectively aiding in the loosening of the soil.

2. The apparatus of claim 1 wherein the first tubular means and the second tubular means include rigid, concentrically disposed tubes, the first tubular means surrounding and being spaced from the second tubular means.

3. The apparatus of claim 2 further including means for conducting the highly pressurized air to the first tubular means, and including a flexible hose connecting the high pressure air source to the pressurized air conducting means;

4. The apparatus of claim 3 including means for conducting the pressurized water to the second tubular means, and including a flexible hose connecting the source of the pressurized water to the pressurized water conducting means.

5. The apparatus of claim 4 wherein the means for conducting the highly pressurized air includes a chamber having an open interior that is in open communication with the first tubular means.

6. The apparatus of claim 5 including a reservoir disposed above the chamber for temporarily storing a fertilizer or chemical treatment material and valve means for controllably releasing the fertilizer or chemical treatment material into the open interior of the chamber.

7. The apparatus of claim 6 including an air valve connected in series relationship with the high pressure air hose and the chamber.

8. The apparatus of claim 7 including a liquid valve connected between the water hose and the second tubular means.

9. The apparatus of claim 8 including a horizontal water pipe attached to an upper wall of the chamber for conducting the water through the wall and into the second tubular means wherein the water valve is open, and an air pipe rigidly connected to the upper wall of the chamber in opposed relationship to the water pipe for conducting pressurized air into the chamber when the air valve is open, the water pipe and the air also pipe serving as handles by means of which the operator can carry and manipulate the apparatus.

10. The apparatus of claim 9 wherein the diameter of the predrilled hole is about two inches and the outside diameter of the first tubular means is about two inches.

11. The apparatus of claim 1 wherein the fertilizer or chemical treatment material is granular.

* * * * *